Feb. 9, 1971 R. R. HOCQ 3,561,897

GAS-FUELED LIGHTERS

Filed July 8, 1969 14 Sheets-Sheet 1

INVENTOR
ROBERT RAYMOND HOCQ
BY
Curtis, Morris & Safford
ATTORNEYS.

Feb. 9, 1971 R. R. HOCQ 3,561,897

GAS-FUELED LIGHTERS

Filed July 8, 1969 14 Sheets-Sheet 2

INVENTOR:
ROBERT RAYMOND HOCQ
BY
Curtis, Morris & Safford
ATTORNEYS.

INVENTOR.
ROBERT RAYMOND HOCQ
BY
Curtis, Morris & Safford
ATTORNEYS

Feb. 9, 1971 R. R. HOCQ 3,561,897

GAS-FUELED LIGHTERS

Filed July 8, 1969 14 Sheets-Sheet 4

INVENTOR:
ROBERT RAYMOND HOCQ
BY

Curtis, Morris & Safford
ATTORNEYS.

GAS-FUELED LIGHTERS

Filed July 8, 1969 14 Sheets-Sheet 5

INVENTOR:
ROBERT RAYMOND HOCQ
BY
Curtis, Morris & Safford
ATTORNEYS

Feb. 9, 1971 R. R. HOCQ 3,561,897

GAS-FUELED LIGHTERS

Filed July 8, 1969 14 Sheets-Sheet 6

INVENTOR:
ROBERT RAYMOND HOCQ
BY
Curtis, Morris & Safford
ATTORNEYS.

GAS-FUELED LIGHTERS

Filed July 8, 1969 14 Sheets-Sheet 7

INVENTOR:
ROBERT RAYMOND HOCQ
BY
Curtis, Morris & Safford
ATTORNEYS.

GAS-FUELED LIGHTERS

Filed July 8, 1969 14 Sheets-Sheet 8

INVENTOR
ROBERT RAYMOND HOCQ

INVENTOR
ROBERT RAYMOND HOCQ

Feb. 9, 1971 R. R. HOCQ 3,561,897

GAS-FUELED LIGHTERS

Filed July 8, 1969 14 Sheets-Sheet 10

INVENTOR
ROBERT RAYMOND HOCQ

INVENTOR
ROBERT RAYMOND HOCQ

Feb. 9, 1971 R. R. HOCQ 3,561,897

GAS-FUELED LIGHTERS

Filed July 8, 1969 14 Sheets-Sheet 12

INVENTOR.
ROBERT RAYMOND HOCQ
BY
Curtis, Morris & Safford
ATTORNEYS.

INVENTOR
ROBERT RAYMOND HOCQ
BY
Curtis, Morris & Safford
ATTORNEYS.

INVENTOR
ROBERT RAYMOND HOCQ
BY
Curtis, Morris & Safford
ATTORNEYS.

United States Patent Office
3,561,897
Patented Feb. 9, 1971

3,561,897
GAS-FUELED LIGHTERS

Robert Raymond Hocq, Boulogne-Billancourt, France, assignor to Societe Franco-Hispano-Americaine FRANCISPAM, Paris, France, a French corporation Filed July 8, 1969, Ser. No. 839,966
Claims priority, application France, July 10, 1968, 158,625
Int. Cl. F23q *2/16*
U.S. Cl. 431—130 14 Claims

ABSTRACT OF THE DISCLOSURE

A gas fueled lighter in which the casing is divided internally into two parts which are separated by a horizontal partition, the bottom part acting as a reservoir for liquid gas and the top part accommodating the operating mechanism which is arranged to be operated by the thumb of a user. The operating mechanism is carried by a lever platform which can be separated en bloc from the casing, and comprises two superimposed parts connected together at one end. The upper part has projecting tongues which position it in the casing and the bottom part acts as an operating lever and has bores in it designed to take the spindles of the lever platform, a flint, and the spindle of the flintwheel, and also has a recess for a flint thrust spring and contains a cam surface which cooperates with a corresponding surface on a valve opening lever.

Figure 1:
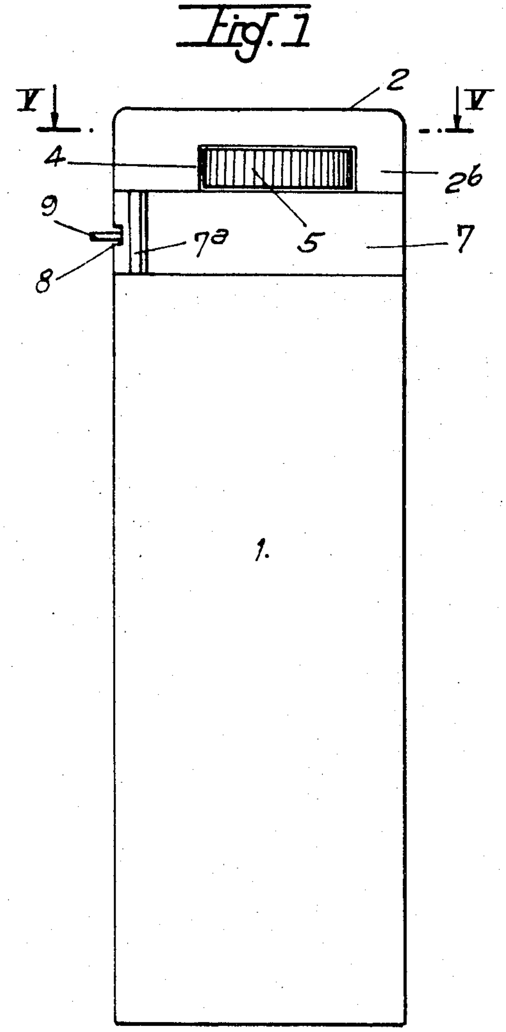

The invention is concerned with a gas fueled lighter of the general kind shown in applicant's co-pending application Ser. No. 706,888, filed Feb. 20, 1968 and now Pat. No. 3,488,136. In that United States application there is described a gas fueled lighter having a diamond-shape cross-section considered in a plane perpendicular to its height, which comprises a body or case divided into two parts by a horizontal partition which separates a bottom part acting as the reservoir for liquid gas, from a top part designed to accommodate an operating mechanism and closed off by a cap or cover, an operating mechanism operable from the exterior of the lighter and which includes a thumbwheel which projects at one lateral face of the body, carries a flintwheel on its internal face and is assembled perpendicularly in relation to the aforesaid partition in order to be able to rotate about an axis parallel to a flint-holder tube also perpendicular to said partition, and also includes means for opening and closing an expansion valve carried by the partition, the operating element of which is arranged in close proximity to the thumbwheel, and there is also provided a mechanism for regulating the height of the flame, which comprises a pivoting regulating element which, under the action of cam surfaces carried by an operating element operable from the exterior of the lighter, bears with variable force against a part of the valve in order to vary the compression of a porous washer and thus to regulate the gas flow in the conventional way.

The present invention relates to a lighter of this general type in which the assembly of the operating mechanism is carried by a lever platform which can be separated en bloc from the case and has a generally diamond-shaped profile, the platform comprising two superimposed, i.e. adjacently disposed, one on top of the other, upper and lower parts permanently connected with one another towards, i.e. in the general area of, one corner of the diamond and separated by a seating for the flintwheel and its thumbwheel, the upper part having two elastic tongues which provide positioning in relation to a cap which conceals it and outside which the thumbwheel projects, the bottom part, which acts as the operating lever carrying the spindle of the flintwheel and having three parallel bores therein designed respectively to take the spindle of the lever platform which is secured to the aforesaid partition of the lighter case, the spindle of the flintwheel, and at least one flint, and also having a recess adapted to receive and to guide a flint thrust spring and containing a cam surface which co-operates with a corresponding surface on the opening lever.

The pivoting regulating element for regulating the flame height may comprise a plate carrying control cam surfaces and co-operating with the valve by means of a boss, which plate pivots bearing against a projection on the partition. The means for opening and closing the valve may comprise an opening lever pivotable on the aforesaid plate but independent thereof, and a closing lever pivoting on the partition about an axis which passes through the plate, the opening and closing levers respectively co-operating with projections on a burner rod acting as a valve in order to displace said rod in the desired direction.

Preferably, the two tongues on the upper part of the lever platform will be substantially concentric and the outer most one acts as an elastic friction-locking element in relation to the lighter cap, whilst the innermost one acts as a return spring by bearing elastically against the projection of the aforesaid partition in order to force the lever platform into its rest position, the externally operable operating element of the lighter being secured to the bottom part of the lever platform. It is advantageous to provide co-operating elements on the lever platform and the projection secured to the partition and constituting the axis of rotation of the platform, in order to prevent any accidental disengagement between the platform and its pivot.

Preferably, likewise, the recess in the bottom part of the lever platform will contain a substantially horizontal portion about which the flint spring is coiled and a substantially horizontal projection substantially at right-angles to the axis of said portion forming a supporting surface for the substantially horizontal top end of the flint spring, the bottom end of said spring being substantially horizontal in attitude and bearing against a flint.

In one embodiment of the invention the valve closing lever is biassed into its closed position by a spring arranged between one end of said lever and the base of a recess in the partition of the lighter.

The flame height regulating mechanism comprises a lever carrying cam surfaces which co-operate with the cams on the aforesaid plate, said lever being arranged to pivot horizontally about a presetting screw screwed into the partition and passing through the plate, said lever furthermore projecting outside the lighter.

Figure 2:
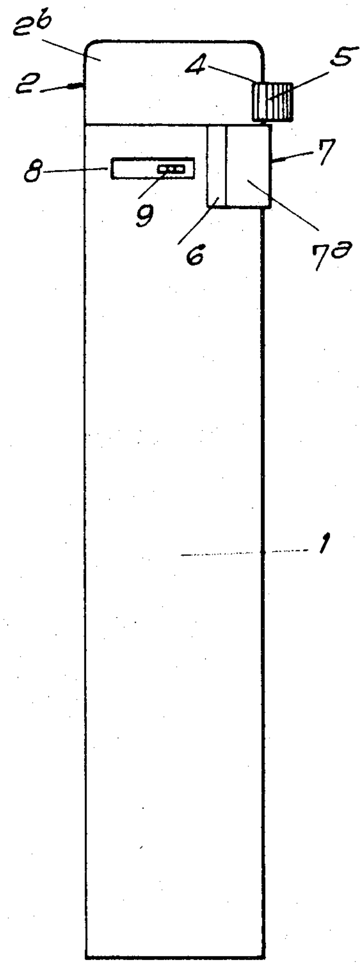
Figure 3:
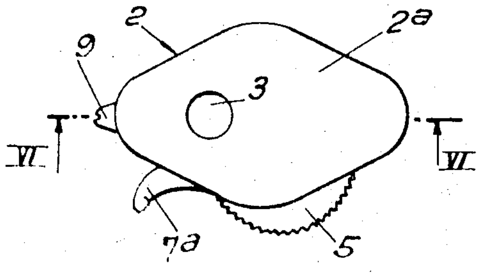
Figure 4:
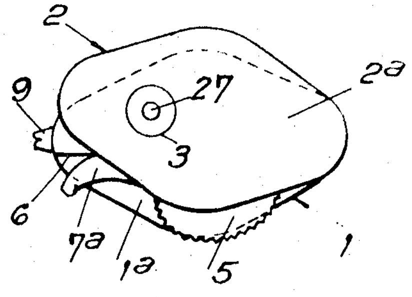
Figure 5:
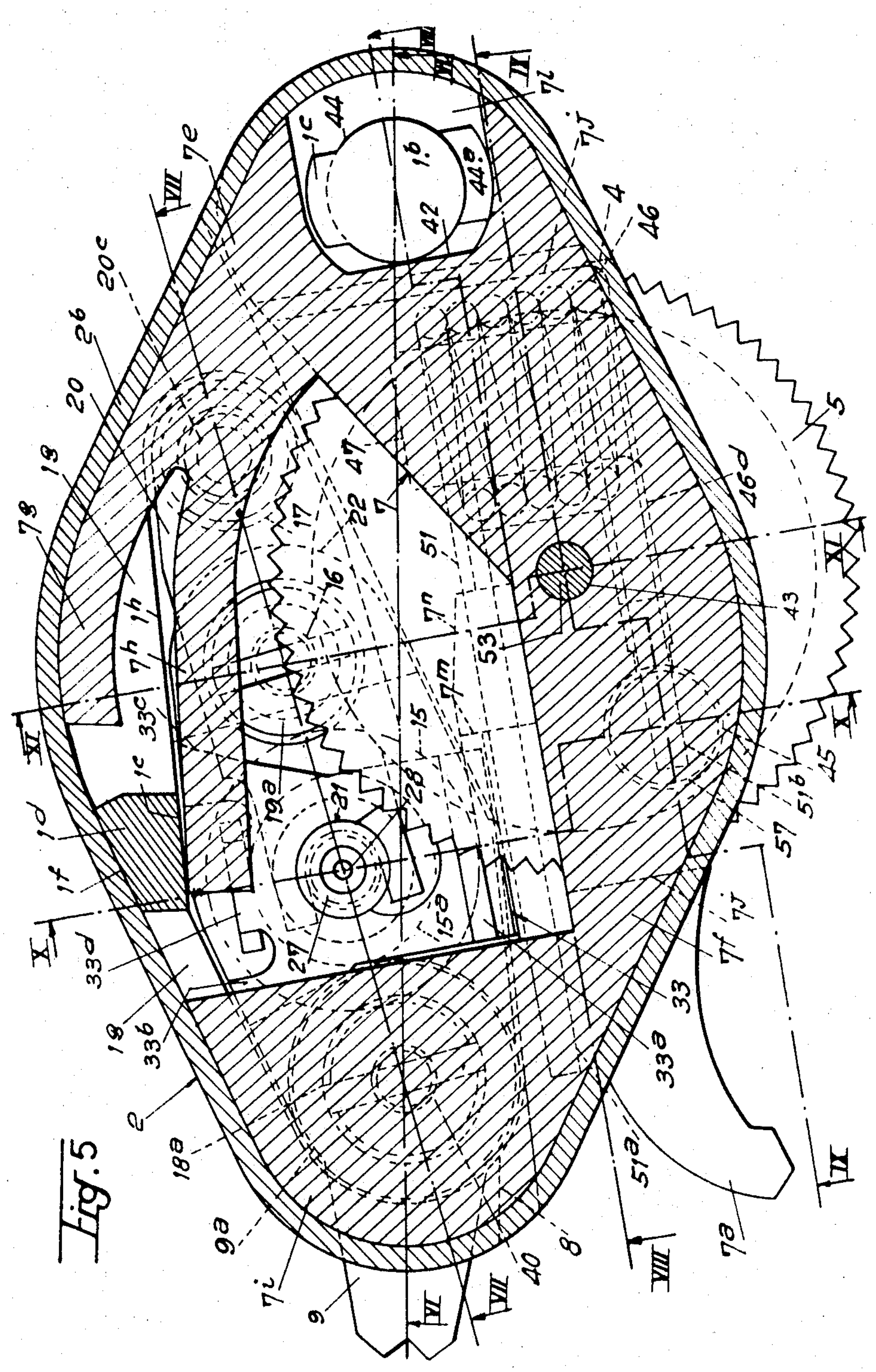
Figure 6:
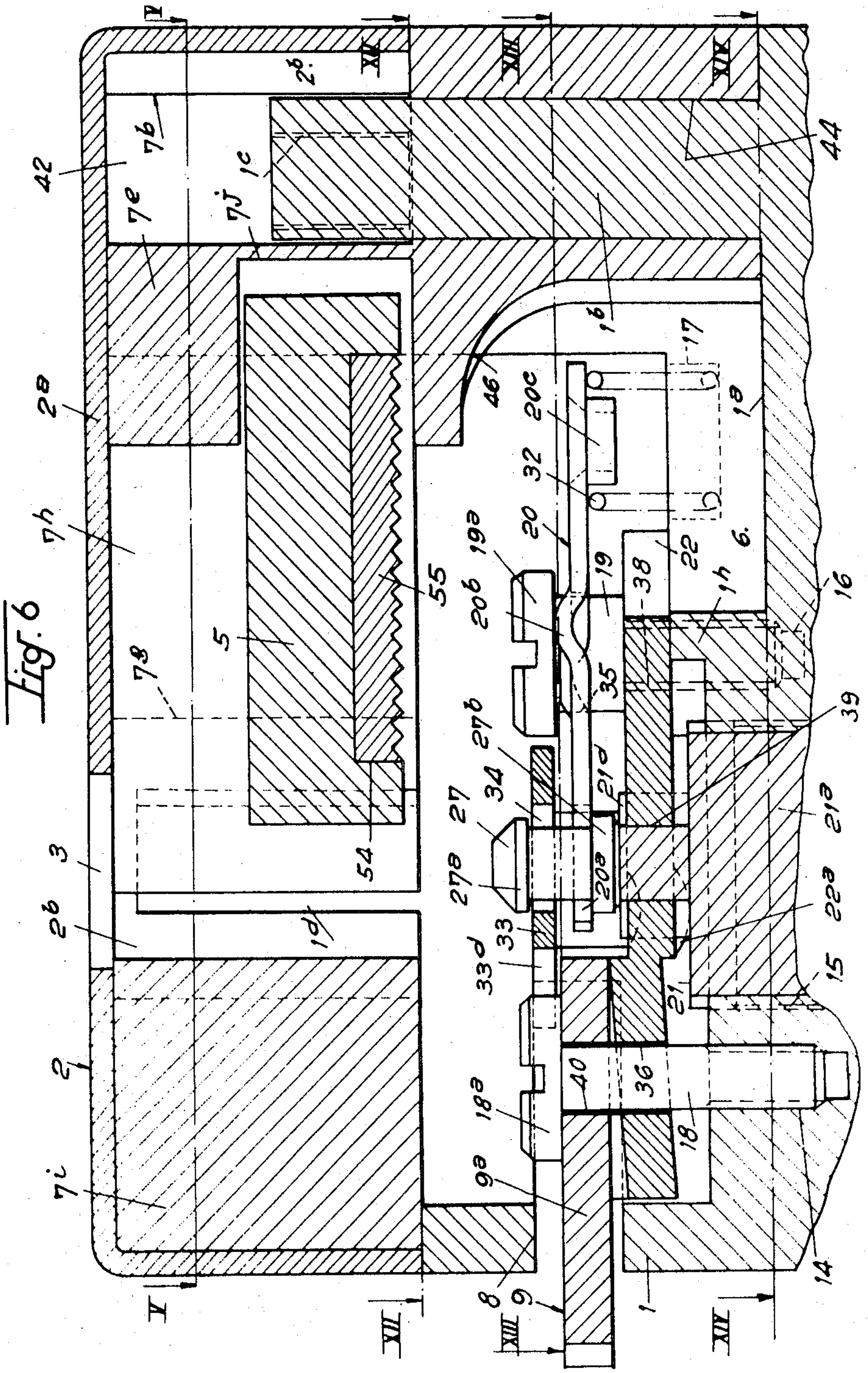
Figure 16:
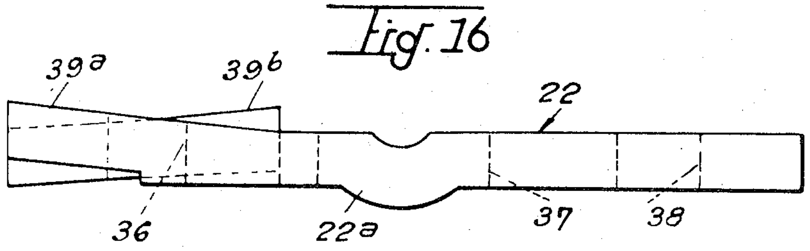
Figure 17:
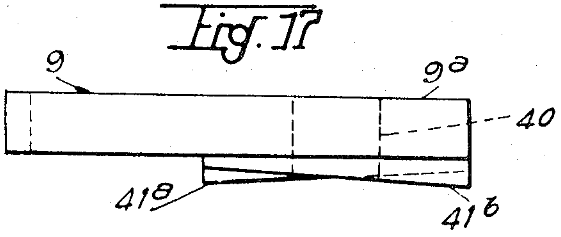
Figure 18:
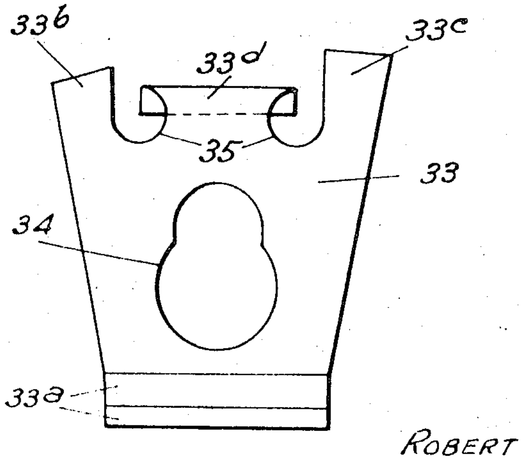
Figure 79:
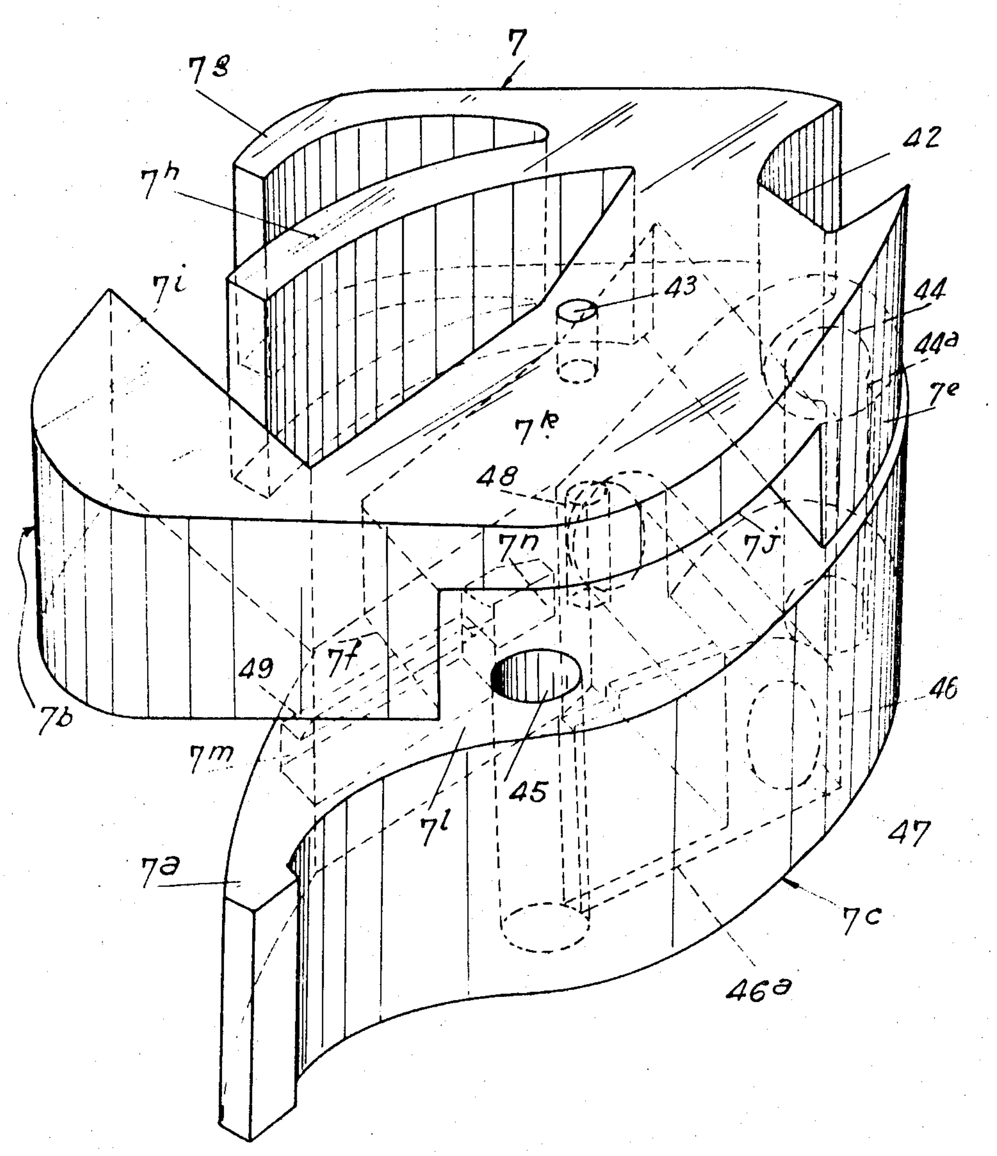
Figure 20:
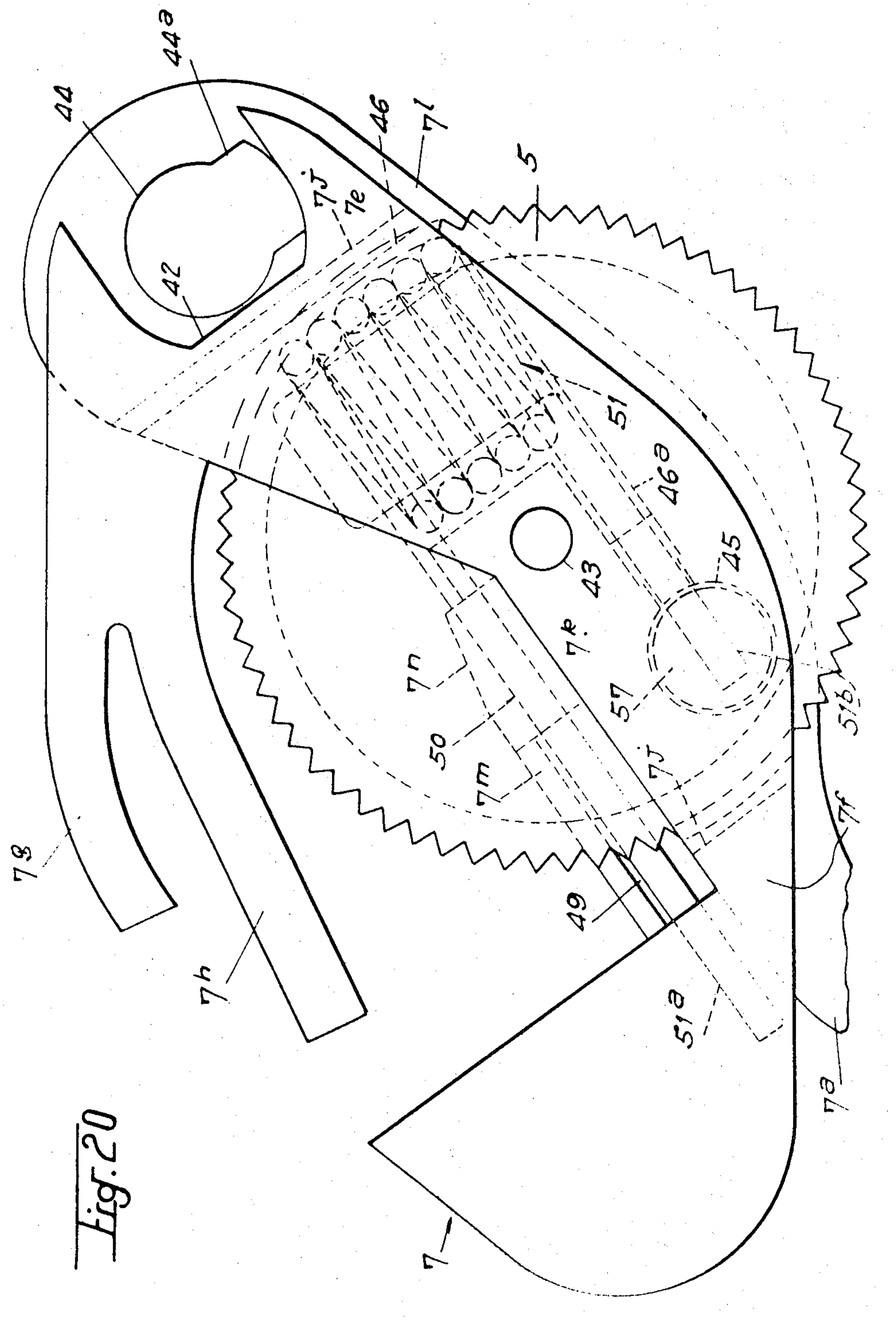

The invention may be carried into practice in various ways and one specific embodiment will now be described by way of example with reference to the accompanying drawings, in which:

FIGS. 1 and 2 are elevational views of a lighter according to the invention, the views being taken at an angular interval of 90° from one another, FIG. 3 is a plan view of the lighter in the inoperative position, FIG. 4 is a similar plan view to FIG. 3 showing the operative parts in the positions which they adopt when the lighter is operated, FIG. 5 is a section on the line V—V of FIGS. 1 and 6, FIG. 6 is a section on the line VI—VI of FIGS. 3 and 5, FIGS. 7 to 11 are respectively sections on the lines VII—VII, VIII—VIII, IX—IX, X—X and XI—XI of FIG. 5, FIGS. 12 to 14 are respective sections on the lines XII—XII, XIII—XIII and XIV—XIV of FIGS. 6 to 8, FIG. 15 is a plan view and FIG. 16 an elevational view, of the plate responsible for regulating the height of the flame, FIG. 17 is an elevational view of the lever responsible for regulating the height of the flame, FIG. 18 is a plan view of the valve opening lever, FIG. 19 is a perspective view of the lever platform on its own, and FIG. 20 is a plan view of the platform lever and the elements which it carries.

FIGS. 1 to 3 show a lighter according to the invention which has the same external appearance as the lighter described in the application referred to above. The lighter comprises a body 1 of diamond-shaped cross-section with rounded corners and provided with a cap 2 forming its top. The top face 2*a* of the cap 2 contains a circular hole 3 for the passage of the flame, and the vertical wall 2*b* of the cap contains an opening 4 along its bottom edge for a thumbwheel 5. The body 1 contains a recess indicated generally at 6 in which is received a lever platform indicated generally at 7 and constituting one of the essential features of the invention. The body also has near its top end a horizontal slot 8 through which passes a lever 9 for regulating the flame height. The lever platform 7 comprises a thumb catch 7*a* which projects outside the case, in a similar manner to the thumb-wheel 5 so that it can easily be operated by the user.

FIGS. 5 to 14 are sections showing details of the lighter operating mechanism, and they will now be referred to to aid in the general description of the main elements of the lighter, the lever platform being more specifically described in relation to FIGS. 19 and 20 as well.

Figure 14:
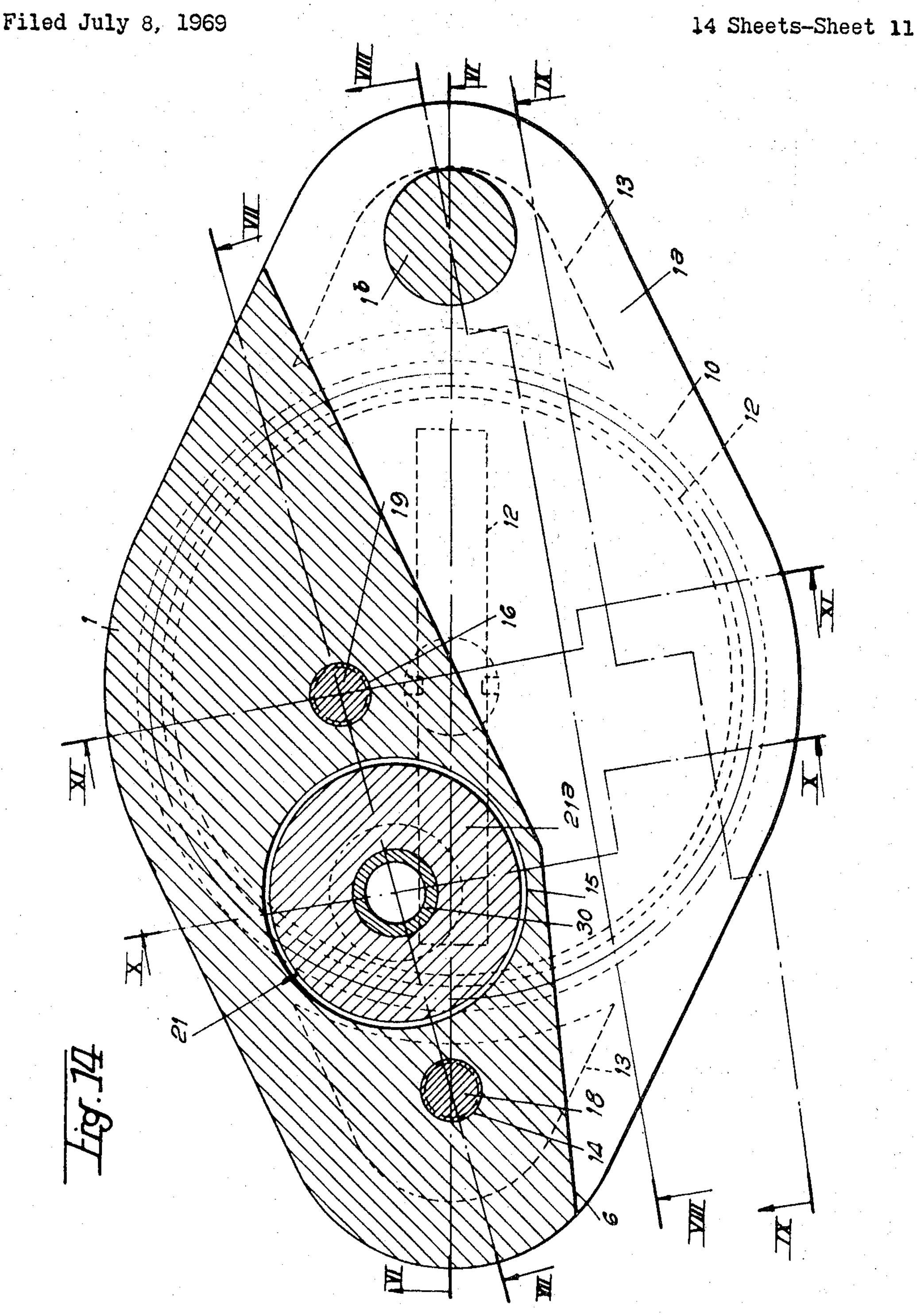
Figure 15:
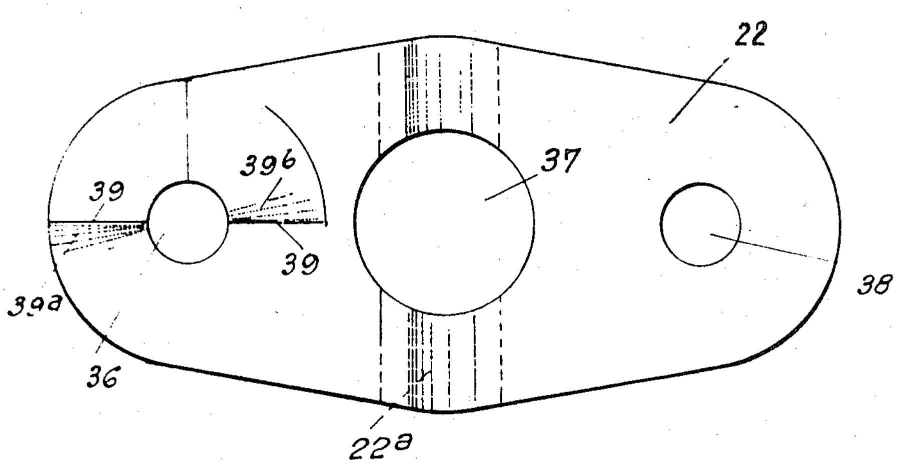

The body 1 is preferably formed of a molded plastics material and has a plan shape as shown in FIG. 14. It comprises a main bottom portion on the upper end of which is a flat top face 1*a*, this main portion containing a main bore or chamber 10 designed to receive a charge of liquid gas. The bore or chamber 10 is closed at the bottom end by a cap or plug 11 containing a slot 12 into which a screwdriver or a similar tool can be inserted in order to screw in or unscrew the plug. Two recesses 13 in the bottom part of the body 1 are provided simply to lighten it. The arrangement of the cartridge in the bore 10 does not form part of the subject of the present invention. A vertical wall 6 projecting from the face 1*a* forms one wall of the aforesaid recess. The body 1 contains a certain number of holes or bores 14 to 17, the purpose of which will be explained hereinafter. The body 1 also has at its top part a projection 1*b* in the form of a stud (FIGS. 5, 6, 8 and 12 to 14), which acts as a fulcrum for the lever platform 7 and which has at its top end a key 1*c* (FIGS. 5, 6 and 8) designed to prevent the lever platform 7 from being incorrectly fitted, as will be explained hereafter. The body 1 also has a small stop pillar 1*d* (FIGS. 5 to 8, 10 and 12) a section of which is visible in FIGS. 5 and 12 and which has an abutment surface 1*e* co-operating with an ad hoc part of the lever platform 7, as well as an abutment surface 1*f* (FIGS. 5 and 12) co-operating with ad hoc part of the bottom vertical wall 2*b* of the cap 2. Finally, the section 1*g* from which the pillar 1*d* projects, has a horizontal contour 1*h* the shape of which is visible in FIGS. 5, 7 and 11 to 13.

The holes 14, 16 and 17 are blind, i.e. open only at one end. The two first ones are threaded in order respectively to take a regulating screw 18 with a head 18*a* (FIGS. 5 to 8 and 12 to 14), and a screw 19 with a head 19*a*, for the attachment of a lever 20 which closes the valve 21 of the lighter (FIGS. 5 to 8 and 10 to 14). The bore 15 has an upper larger diameter portion designed to take the largest diameter section 21*a* of the valve 21 (FIGS. 6 to 8, 10 and 14), a smaller diameter central portion 15*a*, designed to receive a corresponding section 21*b* of the valve, and finally a bottom section 15*b* of still smaller diameter (FIG. 7) which communicates with the bore 10 and takes the bottom section 21*c* of the valve. The bore 15, 15*a*, 15*b* is smooth-walled.

Figure 7:
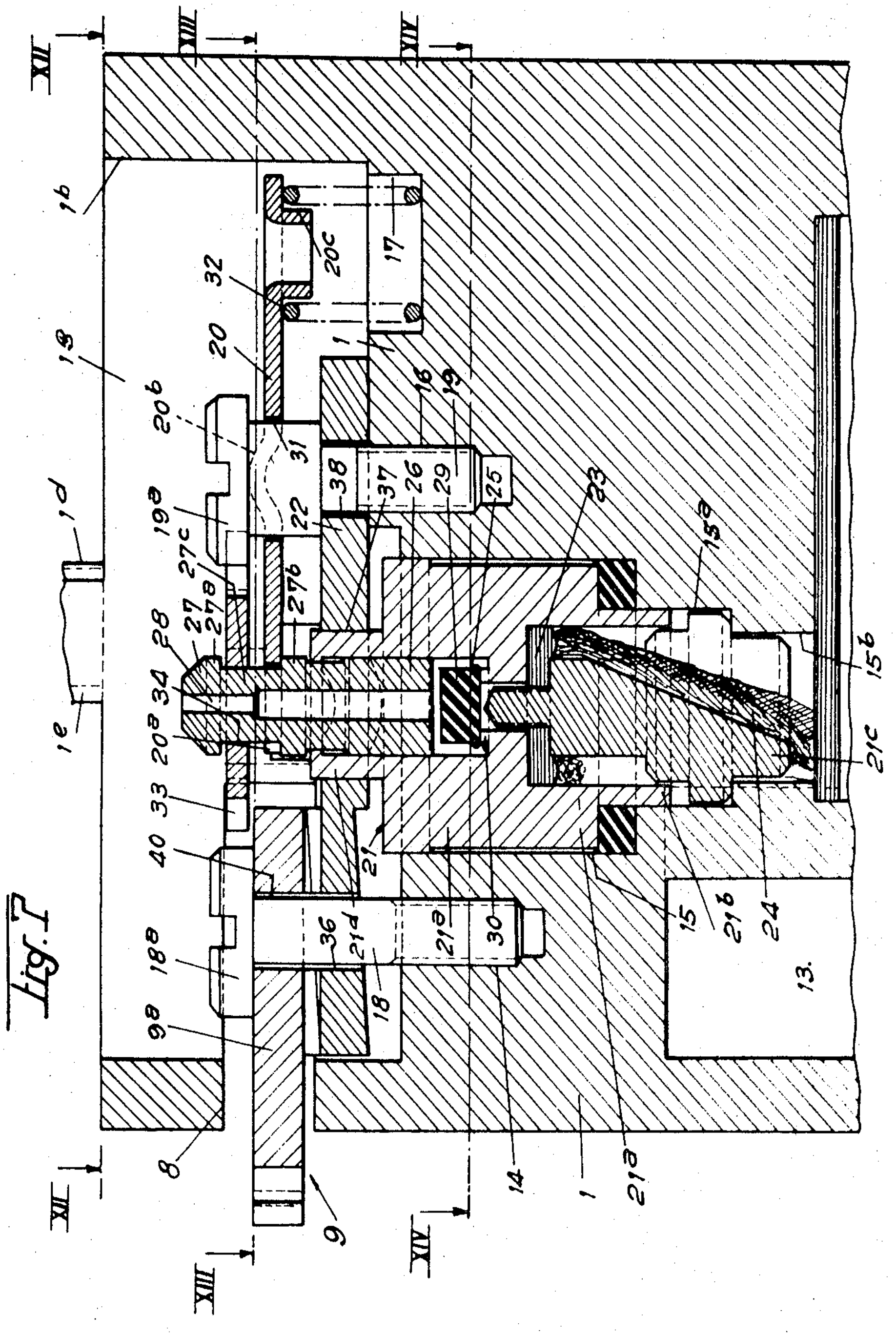
Figure 8:
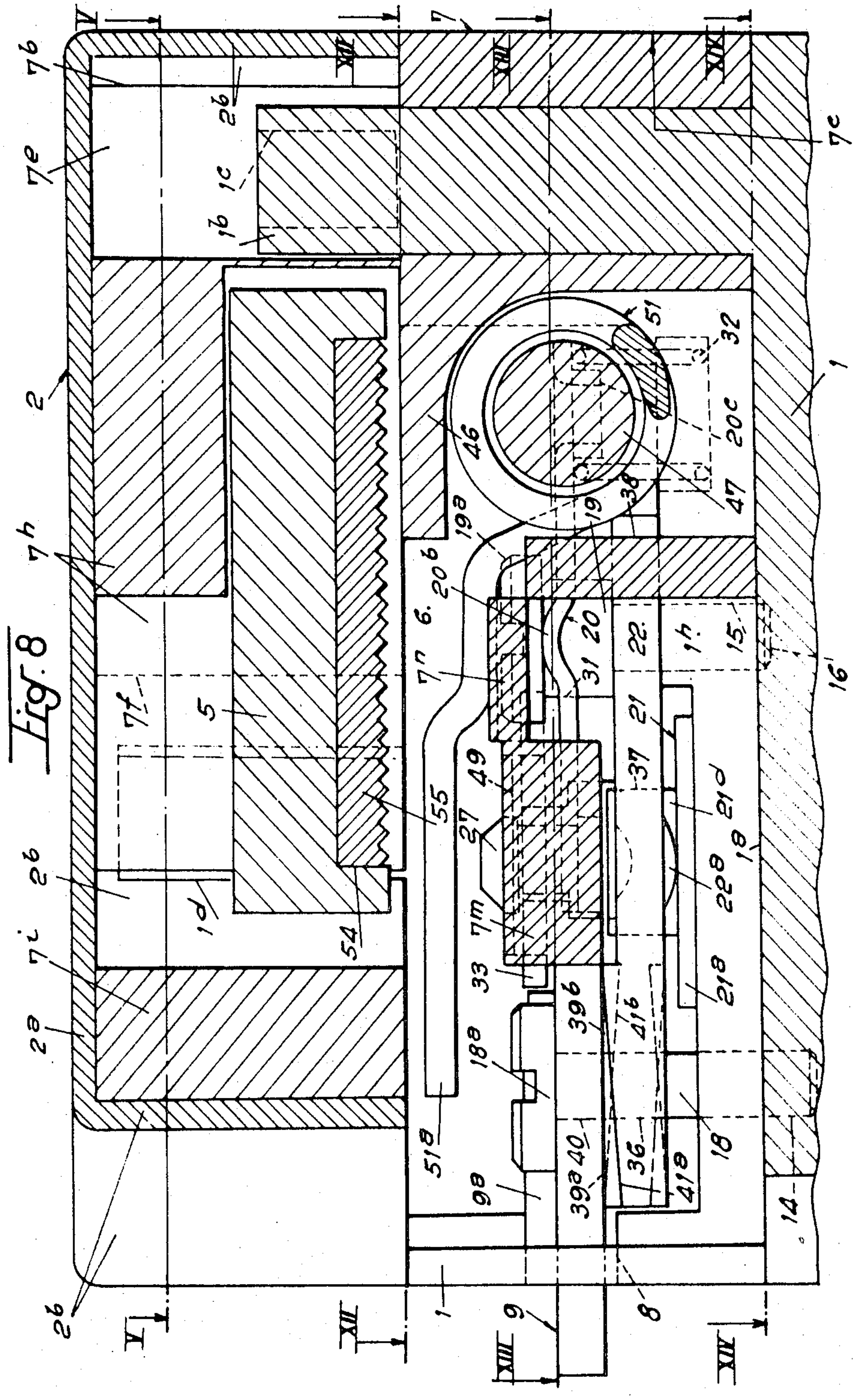
Figure 10:
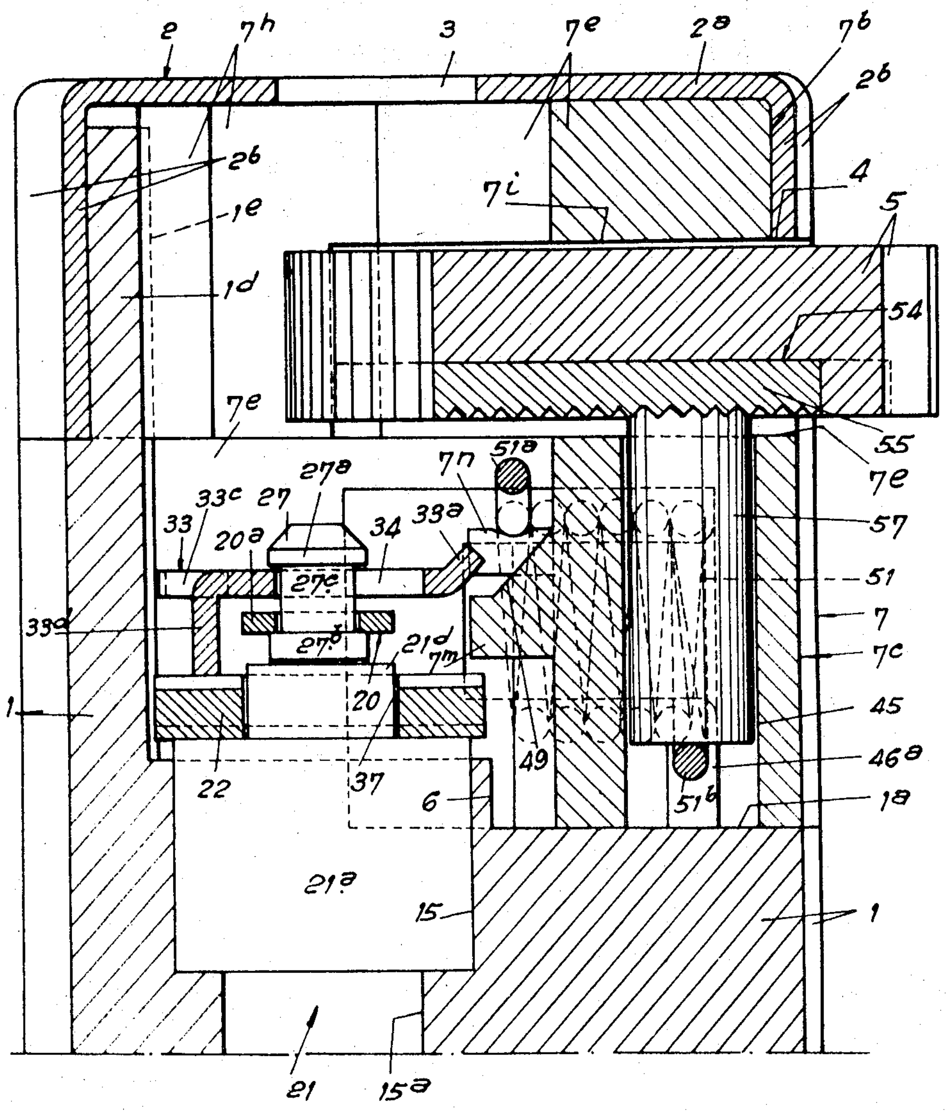
Figure 11:
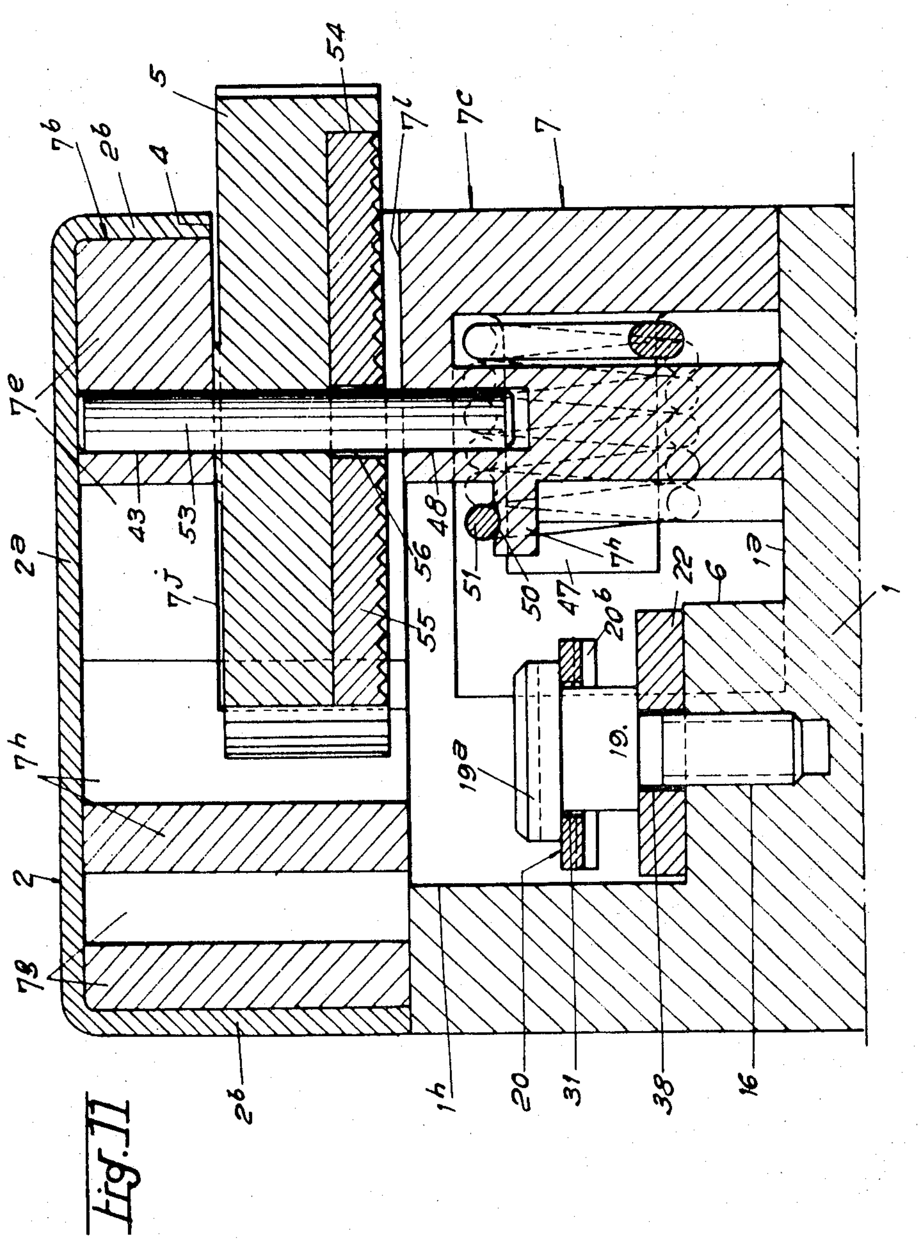
Figure 12:
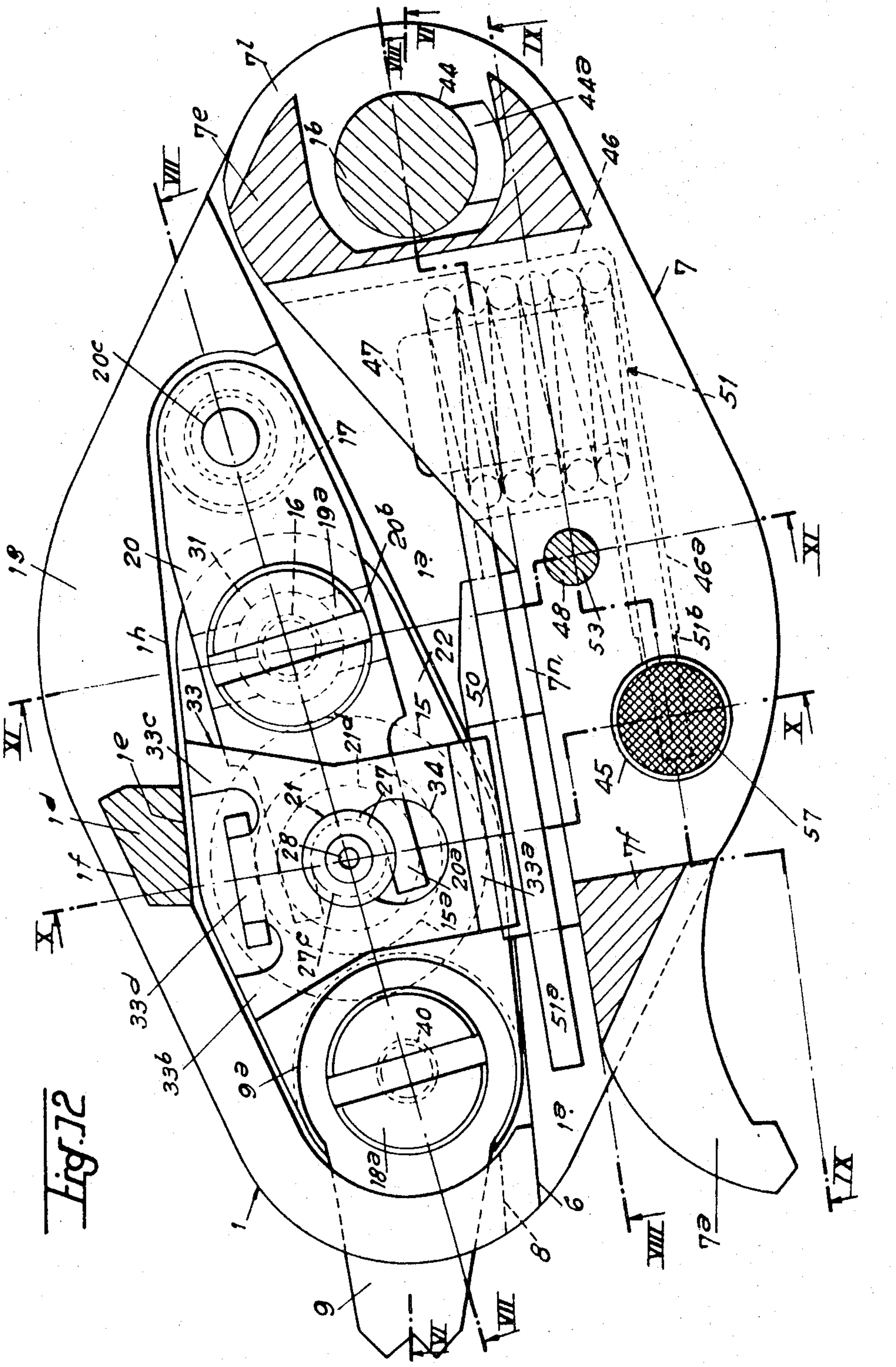
Figure 13:
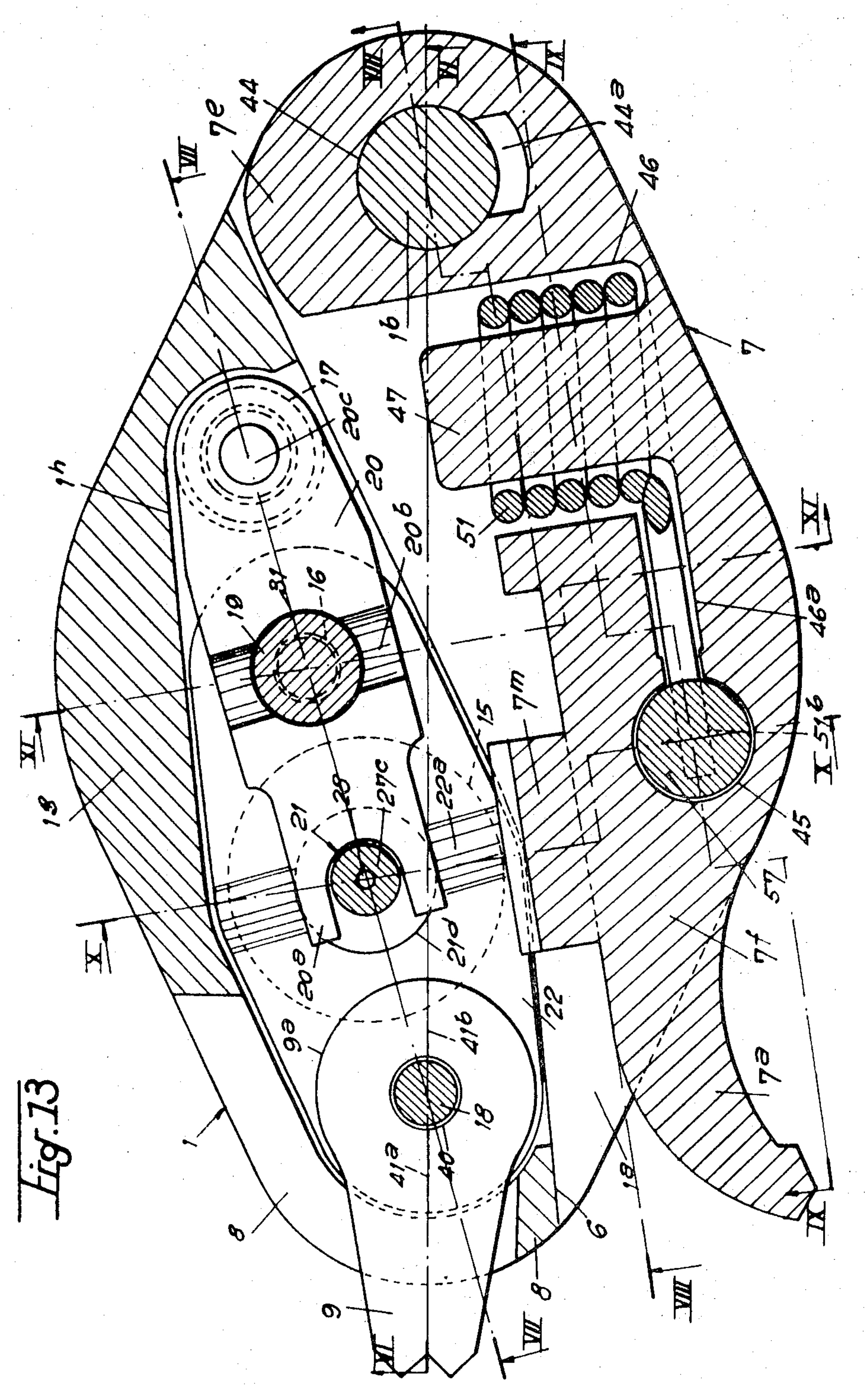

The valve 21 (FIG. 7) is of the kind described in the application referred to. It has an axial boss 21*d* at its top part, around which there is located a regulating plate 22 (FIGS. 6 to 8, 10 and 13) which will be described hereinafter. The portion 21*c* acts as a wick-holder and supporting component for effecting the variable compression of a porous washes 23 and a wick 24. In the boss 21*d* and the valve body 21*a* a bore 25 is formed in which there slides a burner poppet valve 26 with a head 27, and having two collars 27*a* and 27*b* separated from one another by a waisted section 27*c*. The burner contains an axial passage 28 which can be closed off by a seal of rubber or similar material 29, co-operating with an annular seat 30 (FIGS. 7 and 14). The lever 20 has a forked end 20*a* which bears against the collar 27*b* in order to lower the burner and close the valve. Adjacent the center of its length, the lever has a near-cylindrical boss 20*b* (FIGS. 6 to 8 and 11) press-formed so that it projects upwards, through which the lever bears against the head 19*a* of the screw 19, the screw 19 passing through a hole 31 in the lever. Finally, adjacent the end remote from the end at which the fork 20*a* is located, the lever 20 has a cylindrical boss 20*c* with its axis vertically disposed (FIGS. 5 to 8, 12 and 13) which is lodged in the bore 17 of the body and serves to center a helical spring 32 (FIGS. 6 to 8) bearing against the base of the bore 17 and the bottom face of the lever 20, and biasing the corresponding end of the lever upwards in order that the fork 20*a* is applied against the collar 27*d*. In addition, a valve opening lever 33 which, in plan, has the form partially visible in FIG. 5 and better apparent in FIGS. 12 and 18, and which, in elevation, has the form shown in FIG. 10, its position furthermore being indicated in FIGS. 6 to 8, is provided and is constituted by a more or less trapezoidally-shaped plate containing an opening 34 in the form of a locking hole, situated near the center. The smaller arm of the lever is folded upwards at 45° at 33*a*, whilst the larger area section of the lever is cut out at 35 to form two lateral horizontal tongues 33*b*, 33*c*, and one central tongue 33*d* which is folded downwards at 90°. The opening 34 is designed to take the head 27 of the burner, the narrower part of the locking hole engaging beneath the collar 27*a* (FIG. 10). The lever 33 can pivot, bearing against the regulating plate 22 (FIG. 10) in order to lift the head of the burner through the medium of the collar 27*a* and thus lift the seal 29 away from the seat 30. The operation of the levers 20 and 33 will be described later.

The shape of the regulating plate 22 can be seen in plan in FIGS. 5, 12, 13 and 15, in section in FIGS. 6 and 7, and in elevation in FIGS. 8 (partially) and 16. It contains three holes 36 to 38 respectively intended for the passage of the regulating screw 18, the boss 21*d* of the valve, and the fixing screw 19. In addition, at the location of the hole 37 but over a width (measured in the direction of the major dimension of the plate) which is less than the diameter of said hole, it has a boss 22*a* directed downwards and constituted by a substantially cylindrical pressed formation through which the plate bears against the part 21*a* of the valve. Finally, at either side of the hole 36, the plate 22 is partially slotted in the longitudinal direction, by punching or forming, as indicate at 39, over a width corresponding substantially to the diameter of a cylindrical section 9*a* of the regulating lever 9, and is slightly pressed out in opposite directions as clearly shown in FIGS. 15 and 16, in order to form cam surfaces 39*a*, 39*b* which, when the lever 9 is pivoted around the screw 18 through the medium of a hole 40, co-operate with similar cam surfaces 41*a*, 41*b* formed in the same fashion, by pressing or moulding, in the part 9*a*, so that the boss 22*a* is pressed more or less forcibly against the part 21*a* of the valve. The plate 22, in the inoperative condition, bears against a part 1*h* of the body 1 (FIGS. 6 to 8).

The lever platform 7 and the elements which it carries, will now be described, making reference more particularly albeit not exclusively to FIGS. 19 and 20.

The lever platform is made of a relatively flexible plastics material, which is elastic when used in sufficiently small thickness. It has a complex shape and contains a fairly large number of bores or cavities.

The general external shape of the platform is determined by the fact that it must be accommodated within the cap 2 and cannot, with the exception of the thumb catch 7*a*, project beyond the external surface of the body 1. It is made up substantially of two superimposed elements indicated generally at 7*b* and 7*c*, the thumb catch 7*a* constituting a projecting part of the bottom element 7*c*. The elements 7*b* and 7*c* are connected at one end by two vertical portions 7*e*, 7*f*.

The top elements 7*b* has two tongues 7*g*, 7*h* which are connected to the part 7*b*, and an extremity 7*i* internally limited by a flat vertical wall, and it is cut at its bottom region to form a cavity 7*j*. The portion 7*e* is provided with a recess 42. A bore 43 links the top face 7*k* of the lever platform with a cavity 7*j*.

The bottom element 7*c* has a top surface 7*l* containing a vertical bore 44 with a slot or keyway 44*a*. The surface 7*l* is also pierced by a vertical bore 45 and by a cavity 46 of complex shape into which a horizontal overhanging portion 47 extends cantilever fashion.

A lateral extension 46*a* of the cavity 46 communicates with the bore 45 and a bore 48 is aligned with the bore 43. A horizontal projection 7*m* (FIGS. 5, 8, 10, 12, 13, 19 and 20) is provided in its top face with a cam surface 49 designed to co-operate with the extremity 33*a* of the valve lever. A horizontal projection 7*n*, located on the extension 7*m* but at a slightly higher level, is provided in its top face with a groove 50 designed to take one horizontal end 51*a* of a spiral flint spring 51 which is wrapped around the overhanging portion 47 (FIGS. 5, 8 to 13 and 20).

Figure 9:
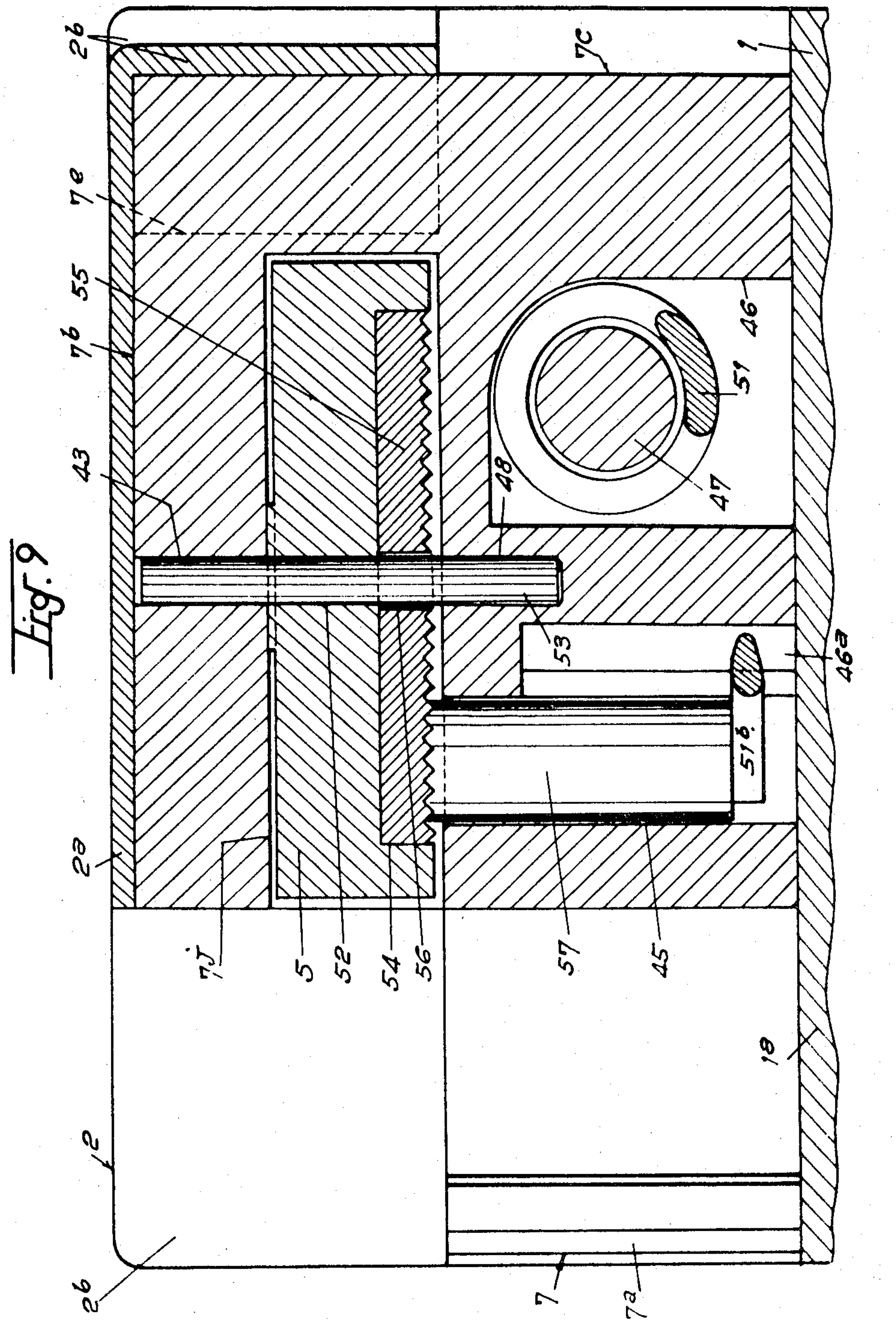

The cavity 7*j* receives the driver 5 which has a central hole 52 to take a spindle 53 mounted in the bores 43 and 48 of the platform, and which has on its bottom face a cylindrical seating 54 for the accommodation of the flintwheel 55 through which the spindle 53 passes freely at 56. Against the bottom face of the flintwheel rubs a flint 57 located in the bore 45 of the lever platform (FIGS. 9 and 10). The bottom end 51*b* of the spring 51 bears against the base of the flint 57 (FIGS. 5, 9, 10, 12, 13 and 20) and urges the flint into contact with the flintwheel. The thumbwheel 5 will preferably be milled as shown for example in FIGS. 3 to 5, 10 and 20.

The lever platform 7 is assembled upon the body 1 to pivot about the spindle 1*b*. The key 1*c* prevents the platform from accidentally disengaging, as will be understood hereinafter.

When the platform is assembled on the body 1, with the cap 2 in place, its tongue 7*g* bears elastically against the wall 2*b* of the cap and, by friction, prevents the latter from becoming accidentally detached. The tongue 7*h* bears elastically against the vertical flat face 1*e* of the small pillar 1*d* and plays the part of a return spring. The thumbwheel 5 projects externally of the lighter in the same way as the thumb catch 7*a*.

In order to assemble the platform on the body 1, the bore 44 is aranged so that the keyway 44*a* coincides with the key 1*c* on the spindle 1*b*, and the platform is then lowered until it hits the body 1. The assembly is then rotated through 180° in the clockwise direction in order to bring the platform into its normal rest position. It is held in this position and the cap 2 is lowered so that the internal face of the cap comes into contact with the face 1*f* of the small pillar 1*d*.

In order to dismantle the mechanism in order to change the flint 57, the cap 2 is removed by lifting it vertically upwards. The lever platform 7 is rotated through 180° in the anticlockwise direction in order to bring the keyway 44*a* opposite the key 1*c*. The platform is then raised in order to disengage it from the spindle 1*b*.

Then, the arm 51*a* of the spring 51 is released from the projection 7*n* around which it hooks; the spring relaxes and the end 51*b* frees the flint 57. The flint can then be replaced by a new one after which the spring 51 is compressed again and the end 51*a* is hooked in position at 7*n*. The end 51*b* then applies the new flint 57 against the flintwheel 55. The only operation then remaining is to replace the platform and the cap in the manner described hereinbefore.

The operation of the lighter is as follows:

When the user moves the thumbwheel 5, the lever platform 7 starts to pivot around the pivot 1*b*, and this commences the opening of the valve as a consequence of the lifting of the head 27 of the burner by the lever 33 (FIG. 10), and the end 33*a* of said lever being in contact with the cam 49 which lifts it progressively as the platform 7 rotates. The user's thumb continues its movement from right to left (in FIG. 1) and automatically hits the thumb catch 7*a*, causing the platform and the cap (FIG. 4) to pivot completely. During this movement, the valve 21 opens completely, if it was not already open, and the flintwheel 55 strokes the flint 57, the sparks igniting the gas leaving the passage 28 in the burner. The pivoting of the platform brings the orifice 3 in the cap 2 into alignment with the burner (FIG. 4) so that the flame can leave the lighter.

It is important to remember that the assembly of cap and lever platform cannot be operated unless the body 1 is firmly held, and this prevents any risk of accidental ignition or of the escape of gas whilst the lighter is in the user's pocket.

The pivoting of the platform is limited by the bottom section of the part 7*f* of the platform coming into contact with the part 6 of the body 1. The movement of the platform and of the cap, will be clearly apparent from a comparison of FIGS. 3 and 4.

When the pressure on the thumbwheel and the thumb catch is relaxed, the elasticity of the tongue 7*h* returns the assembly of platform and cap to the rest position. At the same time, the spring 32 of the closing lever 20, which was closed at the time of opening by the lifting of the fork 20*a* through the medium of the collar 27*b* of the burner head, this under the action of the lever 33, returns the lever 20 into the rest position and closes the valve again. The load of the spring 32 is calculated so as to balance the thrust of the gas in the reservoir which would otherwise tend to lift the burner if the lever 20 were not provided.

The regulating of the flame height is effected in the following way:

The screw 18 makes it possible to regulate the flame height by displacing the plate 22 and the lever 9 en bloc, in order to compress either more or less the section 21*a* of the valve by pivoting the plate 22 about the projection 1*h* of the body 1, and the rotation of the lever 9 lowers the plate 22 to a greater or lesser extent through the medium of the cam surfaces 39*a*, 39*b* and 41*a*, 41*b*, this making it possible to regulate the flame height from a given position of the screw 18, with a high degree of accuracy.

The embodiment described and illustrated here has been given purely by way of example and is open to numerous modifications without departing from the scope of the invention.

What we claim is:

1. A gas fueled lighter comprising, in combination, an expansion valve, means for opening and closing said valve, means for regulating the gas flow through said valve, an operating mechanism including a flint-holder tube and a flintwheel having a spindle, an elongated case, a partition for separating said case into a bottom portion for receiv- liquid gas and a top portion for accommodating said operating mechanism, and a lever platform adapted to fit in said top portion for carrying said operating mechanism and adapted to be separated from said top portion as a unit, said lever platform comprising an upper part and a lower part connected together and separated by a seating for said flintwheel, said lower part defining an operating lever having at least two bores therein, one for receiving the spindle of said flintwheel and the other for defining said flint-holder tube, and a cam surface thereon, adapted to co-operate with a corresponding surface of the opening and closing means, for opening said valve.

2. A gas fueled lighter as described in claim 1 having a spindle projecting upwardly from said partition for holdiing said lever platform for rotation thereabout and a third bore in said lever platform for receiving said spindle.

3. A gas fueled lighter as described in claim 2 having a cap for said top portion and wherein said upper part of said lever platform fits within said cap and has at least one tongue for positioning said lever platform in relation to said cap.

4. A gas fueled lighter as described in claim 3 wherein said lighter has a generally diamond-shaped cross-section as viewed in a plane perpendicular to its longitudinal axis, and wherein said upper and lower parts of said lever platform are connected to one another at the general area of a corner of said diamond.

5. A gas fueled lighter as described in claim 4 wherein the longitudinal axis of said spindle of said flintwheel and the longitudinal axis of said flint-holder tube are parallel to each other, each having their longitudinal axis aligned perpendicular to the plane of said partition, and wherein said flintwheel is carried on an internal face of a thumbwheel, which thumbwheel is mounted on said flintwheel spindle for rotation and projects from one lateral face of said case to be operated from the exterior of said lighter, said thumbwheel being located close to said means for opening and closing said valve.

6. A gas fueled lighter as described in claim 5 wherein said lower part of said lever platform has a recess defined therein adapted to receive and to position a flint-thrust spring.

7. A gas fueled lighter as described in claim 6 wherein said means for regulating the flow of gas for regulating the flame height comprises a pivotally mounted regulating element to be pressed with variable force against said valve in rder to vary the compression of a porous washer therein, and a flame height operating element, operable from the exterior of the lighter, having at least one cam surface adapted to co-operate with a corresponding surface on the regulating element to thereby vary the force with which said element presses against said valve.

8. A lighter as described in claim 7 wherein the pivotally mounted regulating element for regulating the flame height comprises a plate having thereon said cam surface with which said cam surface of said flame-height operating element co-operates, said plate having a boss for pressing against said valve and being mounted to a pivot about a projection on said partition.

9. A lighter as described in claim 8 wherein the means for opening and closing the valve comprises an opening lever pivotable about an end thereof which operably rests on said plate, and a closing lever pivotable about a central portion thereof which operably rests on a surface of said partition and pivots about an axis which passes through said plate, and wherein said valve comprises a burner rod, said opening and closing lever respectively co-operating with projections on said rod for displacing it in the desired direction.

10. A lighter as described in claim 9 having both an outer and an inner tongue on the upper part of the lever platform and wherein said tongues are generally concentric, said outer one having elastic properties and a friction-locking surface and being said tongue for positioning said lever platform in relation to said cap, and said inner tongue for pressing elastically against a projection on said partition for urging said lever platform into its rest position, and wherein said operating lever has an integral operating element which is adapted to be operated from the exterior of the lighter.

11. A lighter as described in claim 10 wherein said spindle projecting upwardly from said partition has elements thereon which co-operate with elements on said lever platform for preventing accidental disengagement of the platform from said spindle.

12. A lighter as described in claim 11 wherein said recess in the bottom part of said lever platform for receiving said flint-thrust spring has a generally horizontal portion projecting therein about which said flint spring is coiled, wherein said flint spring has a generally horizontally-projecting top end and a generally horizontally-projecting bottom end, wherein said lever platform has a generally horizontal projection disposed generally perpendicularly to the longitudinal axis of said portion, said projection having an abutment surface thereon, and wherein the top end of said spring presses against said abutment surface and said bottom end is disposed in said flint-holder tube, whereby it presses against a flint contained therein.

13. A lighter as described in claim 12 wherein said valve closing lever is biased to maintain said valve in a closed position by a spring arranged between one end of said lever and the base of a recess in said partition.

14. A lighter as described in claim 13 wherein said flame height operating element, operable from the exterior of the lighter, is a lever having two cam surfaces thereon which co-operate with two cam surfaces on said plate, said lever being mounted to pivot horizontally about a presetting screw passing through said plate and being screwed to said partition.

References Cited

UNITED STATES PATENTS

| | | | |
|---|---|---|---|
| 2,732,697 | 1/1956 | Peterson et al. | 431—130 |
| 2,769,326 | 11/1956 | Perlin | 431—130 |
| 3,328,980 | 7/1967 | Reim | 431—131X |

EDWARD T. MICHAEL, Primary Examiner

U.S. Cl. X.R.

431—273